United States Patent
Borkar et al.

(10) Patent No.: US 11,755,498 B2
(45) Date of Patent: Sep. 12, 2023

(54) EMULATING SCRATCHPAD FUNCTIONALITY USING CACHES IN PROCESSOR-BASED DEVICES

(71) Applicant: Qualcomm Intelligent Solutions, Inc., San Diego, CA (US)

(72) Inventors: Shekhar Yeshwant Borkar, Beaverton, OR (US); David Stewart Dunning, Portland, OR (US); Nitin Yeshwant Borkar, Redmond, WA (US); Rishi Khan, Wilmington, DE (US); Matthew Scott Radecic, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 549 days.

(21) Appl. No.: 16/840,799

(22) Filed: Apr. 6, 2020

(65) Prior Publication Data
US 2021/0311754 A1 Oct. 7, 2021

(51) Int. Cl.
*G06F 12/126* (2016.01)
*G06F 12/00* (2006.01)
*G06F 12/0893* (2016.01)

(52) U.S. Cl.
CPC ............ *G06F 12/126* (2013.01); *G06F 12/00* (2013.01); *G06F 12/0893* (2013.01); *G06F 2212/50* (2013.01)

(58) Field of Classification Search
CPC .... G06F 9/455; G06F 12/126; G06F 2212/50; G06F 12/0895; G06F 12/00; G06F 12/0893
See application file for complete search history.

(56) References Cited

U.S. PATENT DOCUMENTS

| | | | | |
|---|---|---|---|---|
| 5,974,508 | A * | 10/1999 | Maheshwari | G06F 12/126 710/200 |
| 10,732,878 | B1 * | 8/2020 | Muthiah | G06F 12/0246 |
| 10,922,226 | B1 * | 2/2021 | Dastidar | G06F 12/0804 |

(Continued)

OTHER PUBLICATIONS

Carter N.P., et al., "Runnemede: An Architecture for Ubiquitous High-Performance Computing", IEEE 19th International Symposium on High Performance Computer, 2013, pp. 1-12.

*Primary Examiner* — Aracelis Ruiz
(74) *Attorney, Agent, or Firm* — W&T

(57) ABSTRACT

Emulating scratchpad functionality using caches in processor-based devices is disclosed. In one aspect, each cache line within a cache of a processor-based device is associated with a corresponding scratchpad indicator indicating whether the corresponding cache line is exempt from the replacement policy used to select a cache line for eviction. Upon receiving data that corresponds to a memory access operation indicated as requiring scratchpad functionality, the cache controller stores the data in a cache line of the cache, and then sets the corresponding scratchpad indicator for the cache line. Subsequently, the cache controller emulates scratchpad functionality by allowing conventional memory read and write operations to be performed on the cache line, but does not apply its replacement policy to that cache line when selecting a cache line as a candidate for eviction. In this manner, the cache line may remain in the cache for use as scratchpad memory by software.

20 Claims, 6 Drawing Sheets

(56) References Cited

U.S. PATENT DOCUMENTS

| | | | |
|---|---|---|---|
| 2011/0131381 A1* | 6/2011 | Kaplan | G06F 12/0875 |
| | | | 711/E12.091 |
| 2014/0189247 A1* | 7/2014 | Hughes | G06F 12/123 |
| | | | 711/136 |
| 2016/0275020 A1* | 9/2016 | Huang | G06F 12/1491 |

* cited by examiner

EMULATING SCRATCHPAD FUNCTIONALITY USING CACHES IN PROCESSOR-BASED DEVICES

STATEMENT OF GOVERNMENT SUPPORT

This invention was made with Government support under Agreement No. HR0011-17-3-0005, awarded by DARPA. The Government has certain rights in the invention.

BACKGROUND

I. Field of the Disclosure

The technology of the disclosure relates generally to scratchpad memories in processor-based devices, and, in particular, to techniques and apparatus for implementing scratchpad functionality.

II. Background

"Scratchpad memory" is a type of memory that may be provided by conventional processor-based devices, either as internal scratchpad memory within a processor or as external scratchpad memory outside of the processor, for use by software processes. Scratchpad memory conventionally comprises a local, fixed-size, low-latency memory device that is directly addressable as memory without caching, and for which memory management is explicitly provided by the software using the scratchpad memory rather than being automatically provided by the processor-based device. Consequently, the contents of scratchpad memory are not automatically flushed or written back to a system memory by the processor-based device, but rather are maintained by the processor-based device until a software process overwrites the contents or manually copies the contents back into the system memory. A scratchpad memory may be associated with its own memory address space that is provided by the processor-based device, and that may correspond to a memory address space within the global memory address space of the system memory. The use of scratchpad memory enables a software process to exercise complete control over the data stored therein. For instance, data stored within the scratchpad memory by the software process is guaranteed to remain in the scratchpad memory without being evicted, until the software process removes it.

However, the benefits of scratchpad memory in some aspects may be outweighed by disadvantages. In particular, memory management for scratchpad memory may be complex and difficult to implement, which may negatively impact programmer productivity and/or software performance. For instance, because memory management for scratchpad memory must be manually implemented by software, the software must either provide a mechanism for identifying modified data within the scratchpad memory to write back to the system memory (thus increasing software complexity and decreasing programmer productivity), or must simply write the entire contents of the scratchpad memory back to the system memory (thus unnecessarily consuming processor and memory resources and time). Moreover, the fixed size of the scratchpad memory in hardware may constrain the usability of the scratchpad memory.

Accordingly, it is desirable to provide a mechanism for a processor-based device to provide scratchpad memory functionality without incurring the associated performance and productivity penalties.

SUMMARY OF THE DISCLOSURE

Aspects disclosed in the detailed description include emulating scratchpad functionality using caches in processor-based devices. In this regard, in one aspect, each cache line within a cache of a processing element (PE) of a processor-based device is associated with a corresponding scratchpad indicator. Each scratchpad indicator indicates whether the corresponding cache line is exempt from the replacement policy that a cache controller of the cache conventionally employs when selecting a cache line for eviction. Upon receiving data that corresponds to a memory access operation indicated as requiring scratchpad functionality, the cache controller stores the data in a cache line of the cache, and then sets the corresponding scratchpad indicator for the cache line. Subsequently, the cache controller emulates scratchpad functionality by allowing conventional memory read and write operations to be performed on the cache line, but does not apply its replacement policy to that cache line when selecting a cache line as a candidate for eviction. For example, some aspects may provide that the cache controller will select a candidate for eviction only from among cache lines for which the corresponding scratchpad indicators are not set (i.e., the cache controller will not select as a candidate for eviction any cache lines for which the corresponding scratchpad indicator is set). Some aspects may provide that the cache controller is configured to select, as a candidate for eviction, a cache line having its scratchpad indicator set only if the new cache line to be inserted also corresponds to a subsequent memory access operation indicated as requiring scratchpad functionality.

As a result, cache lines storing data that is read by a memory access operation indicated as requiring scratchpad functionality (e.g., as indicated by a custom scratchpad memory read instruction, or by the cache controller determining that the memory address falls within a specified address range) may remain in the cache for use as scratchpad memory by software. Once the software no longer needs the cache lines being used as scratchpad memory, the software may cause one or more of the scratchpad indicators to be cleared, and the corresponding cache lines may then be evicted or otherwise managed by the cache controller in a conventional manner. In this manner, scratchpad memory functionality may be emulated using the cache, providing the advantages of scratchpad memory without requiring explicit memory management as with conventional scratchpad memory.

In another aspect, a processor-based device is disclosed. The processor-based device comprises a system memory and a PE comprising a cache controller and a cache. The cache comprises a plurality of cache lines and a plurality of corresponding scratchpad indicators to indicate whether each corresponding cache line is exempt from a replacement policy of the cache controller. The cache controller is configured to receive data corresponding to a memory access operation to a memory address of the system memory, and store the data corresponding to the memory address in a cache line of the plurality of cache lines of the cache. The cache controller is further configured to determine that the memory access operation is indicated as requiring scratchpad functionality. The cache controller is also configured to, responsive to determining that the memory access operation is indicated as requiring scratchpad functionality, set a scratchpad indicator of the cache line to indicate that the cache line is exempt from the replacement policy of the cache controller.

In another aspect, a method for emulating scratchpad functionality using caches in processor-based devices is provided. The method comprises receiving, by a cache controller of a cache of a PE of a processor-based device, data corresponding to a memory access operation to a memory address of a system memory of the processor-based device. The method further comprises storing, by the cache controller, the data corresponding to the memory address in a cache line of a plurality of cache lines of the cache. The method also comprises determining that the memory access operation is indicated as requiring scratchpad functionality. The method additionally comprises, responsive to determining that the memory access operation is indicated as requiring scratchpad functionality, setting a scratchpad indicator of the cache line to indicate that the cache line is exempt from a replacement policy of the cache controller.

In another aspect, a processor-based device is provided. The processor-based device comprises a means for receiving data corresponding to a memory access operation to a memory address of a system memory of the processor-based device. The processor-based device further comprises a means for storing the data corresponding to the memory address in a cache line of a plurality of cache lines of a cache of a PE of the processor-based device. The processor-based device also comprises a means for determining that the memory access operation is indicated as requiring scratchpad functionality. The processor-based device additionally comprises a means for setting a scratchpad indicator of the cache line to indicate that the cache line is exempt from a replacement policy of a cache controller, responsive to determining that the memory access operation is indicated as requiring scratchpad functionality.

DETAILED DESCRIPTION

Figure 1:
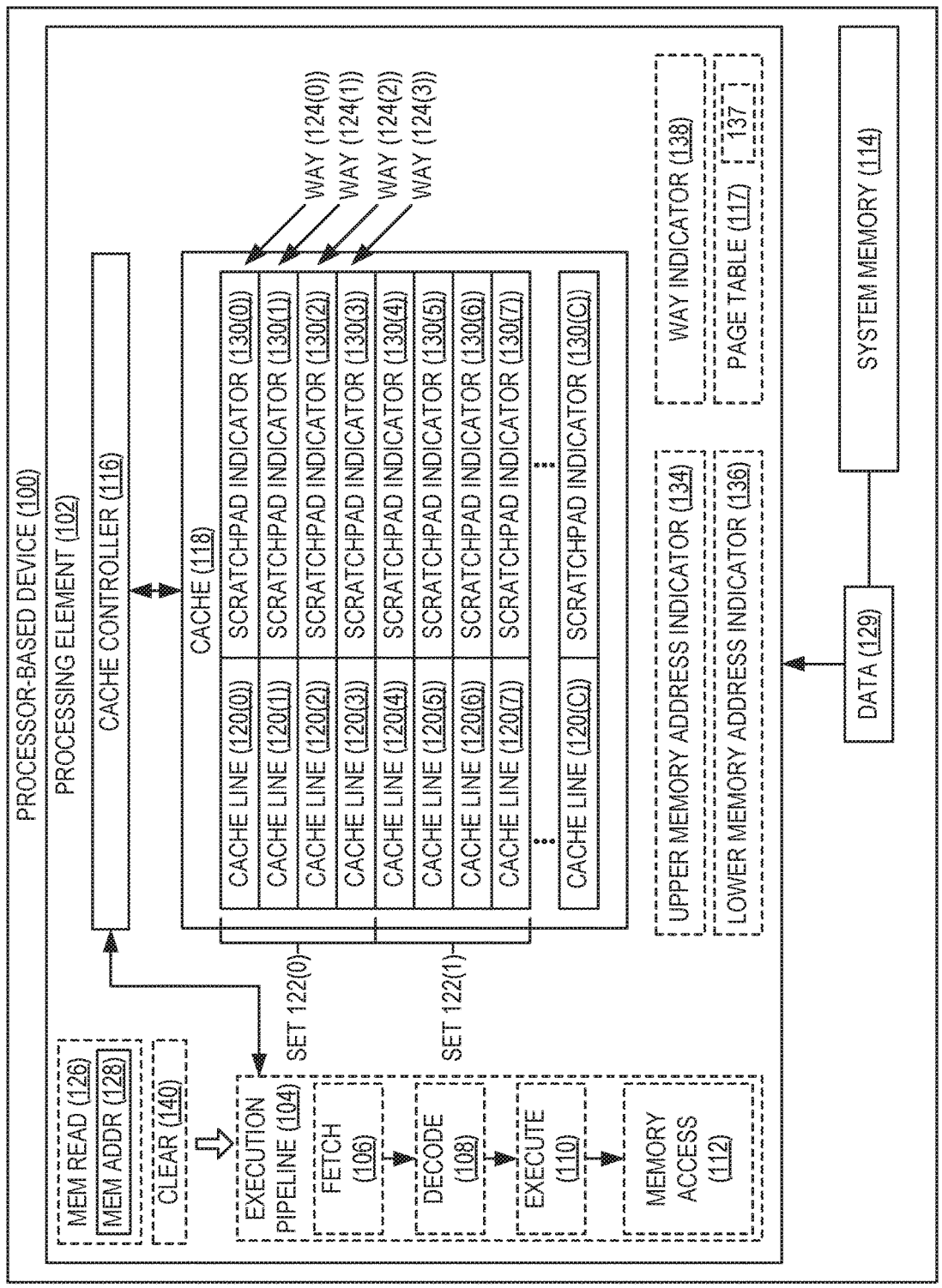
FIG. 1 is a block diagram of an exemplary processor-based device including a cache comprising scratchpad indicators for each cache line, and a cache controller configured to provide scratchpad functionality using the cache, according to one aspect.

With reference now to the drawing figures, several exemplary aspects of the present disclosure are described. The word "exemplary" is used herein to mean "serving as an example, instance, or illustration." Unless otherwise indicated, the terms "first," "second," "third," and so forth are used herein to distinguish between similar elements, and not to indicate an ordinal relationship between such elements. Any aspect described herein as "exemplary" is not necessarily to be construed as preferred or advantageous over other aspects.

Aspects disclosed in the detailed description include emulating scratchpad functionality using caches in processor-based devices. In this regard, FIG. 1 illustrates an exemplary processor-based device 100 that provides a processing element (PE) 102 for processing executable instructions. The PE 102 may comprise a central processing unit (CPU), or may comprise an individual processor core comprising a logical execution unit and associated caches and functional units. It is to be understood that, while the example of FIG. 1 illustrates the processor-based device 100 as including a single PE 102, the processor-based device 100 according to some aspects may comprise multiple PEs 102.

In the example of FIG. 1, the PE 102 includes an execution pipeline 104 that comprises logic circuits for executing an instruction stream comprising computer-executable instructions. The execution pipeline 104 of FIG. 1 includes a fetch stage ("FETCH") 106 for retrieving instructions for execution, a decode stage ("DECODE") 108 for translating fetched instructions into control signals for instruction execution, an execute stage ("EXECUTE") 110 for sending instructions and operands to execution units, and a memory access stage ("MEMORY ACCESS") 112 for carrying out memory access operations (e.g., memory load operations and/or memory store operations) resulting from instruction execution. It is to be understood that, in some aspects, the execution pipeline 104 may include fewer or more stages than those illustrated in the example of FIG. 1.

The PE 102 is communicatively coupled to a system memory 114 of the processor-based device 100. The system memory 114 provides addressable memory used for data storage by the processor-based device 100, and as such may comprise synchronous dynamic random access memory (SDRAM), as a non-limiting example. The PE 102 in some aspects may also provide a plurality of page tables, such as the page table 117, for use in translating virtual memory addresses to physical memory addresses within the system memory 114. The PE 102 further provides a cache controller 116 that is communicatively coupled to a cache 118. The cache 118 provides a plurality of cache lines 120(0)-120(C) that may be used to store frequently accessed data for quicker access by the PE 102 (relative to reading the frequently accessed data from or writing the frequently accessed data to the system memory 114). It is to be understood that each of the cache lines 120(0)-120(C) may comprise additional elements not shown in FIG. 1 for the sake of clarity. As non-limiting examples, the plurality of cache lines 120(0)-120(C) may be associated with a plurality of corresponding data storage regions, tags, validity indicators, flag indicators, and/or "dirty" (i.e., modified data) indicators.

Each of the cache lines 120(0)-120(C) of the cache 118 may be sized to store multiple words of data. The cache lines 120(0)-120(C) in the example of FIG. 1 are organized into sets of equal size, such as sets 122(0) and 122(1), which may be configured using conventional set assignment and addressing schemes. In the example of FIG. 1, the cache lines within a set, such as the cache lines 120(0)-120(3) within the set 122(0), are considered "associative," in the sense that any one of the cache lines 120(0)-120(3) may be used to store data retrieved from a memory address corresponding to the set 122(0). Thus, each set within the cache 118 (such as the set 122(0)) comprises four (4) ways, such as ways 124(0)-124(3) of the set 122(0). It is to be understood that the cache 118 in some aspects may include more or fewer sets and/or more or fewer ways than illustrated in FIG. 1.

In exemplary conventional operation, when a memory access operation is requested (e.g., as a result of the execution pipeline 104 executing a memory read instruction 126 comprising a memory address 128), the cache controller 116 first determines whether the requested data is present in one of the cache lines 120(0)-120(C) within the set indicated by the memory address 128. For example, assume the memory address 128 may correspond to any one of the ways 124(0)-124(3) of the set 122(0). If the requested data is not found in any of the cache lines 120(0)-120(3) corresponding to the ways 124(0)-124(3), then data 129 is read from the memory address 128 in the system memory 114, and can be stored in one of the cache lines 120(0)-120(3) within the set 122(0) indicated by the memory address 128. However, if all of the ways 124(0)-124(3) within the set 122(0) are occupied, then the cache controller 116 selects one of the cache lines 120(0)-120(3) for eviction using a predetermined algorithm referred to herein as a "replacement policy." As a non-limiting example, the replacement policy applied by the cache controller 116 may be a least-recently-used (LRU) policy, under which one of the cache lines 120(0)-120(3) (e.g., the cache line 120(0), as a non-limiting example) whose most recent access is furthest in the past will be selected for eviction. Data for the cache line 120(0) selected for eviction is written to a next level of the memory hierarchy of the processor-based device 100, such as the system memory 114 or another cache such as a Level 2 (L2) cache, a Level 3 (L3) cache, or the like. The selected cache line 120(0) is then used to store newly retrieved data 129 for the memory address 128.

The processor-based device 100 and its constituent elements as illustrated in FIG. 1 may encompass any known digital logic elements, semiconductor circuits, processing cores, and/or memory structures, among other elements, or combinations thereof. Aspects described herein are not restricted to any particular arrangement of elements, and the disclosed techniques may be easily extended to various structures and layouts on semiconductor sockets or packages. It is to be understood that some aspects of the processor-based device 100 may include elements in addition to those illustrated in FIG. 1 (such as, e.g., Level 2 (L2) caches, Level 3 (L3) caches, and/or additional cache controllers or memory controllers), and/or may omit some elements illustrated in FIG. 1.

As discussed above, processor-based devices such as the processor-based device 100 may include a scratchpad memory (not shown) to provide software processes with a local, fixed-size, low-latency memory device that is directly addressable as memory without caching, and for which memory management is explicitly provided by the software using the scratchpad memory rather than being automatically provided by the processor-based device 100. While the use of such scratchpad memory enables software to exercise complete control over the contents therein, it also requires memory management to be manually implemented by software. Thus, for instance, the software must either provide a mechanism for identifying modified data within the scratchpad memory to write back to the system memory 114 (thus increasing software complexity and decreasing programmer productivity), or must simply write the entire contents of the scratchpad memory back to the system memory 114 (thus unnecessarily consuming processor resources and time). The usefulness of such scratchpad memory may also be limited by the fixed size of the scratchpad memory in hardware.

In this regard, the processor-based device of FIG. 1 is configured to emulate scratchpad functionality using the cache controller 116 and the cache 118. As seen in FIG. 1, each of the cache lines 120(0)-120(C) of the cache 118 is associated with a corresponding scratchpad indicator 130(0)-130(C). The scratchpad indicators 130(0)-130(C) in some aspects may comprise bit indicators such as flag bits, and may be provided in addition to other conventional cache line indicators such as validity indicators and/or dirty indicators. The scratchpad indicators 130(0)-130(C) are used to indicate whether the corresponding cache lines 120(0)-120(C) are exempt from the replacement policy applied by the cache controller 116 when selecting one of the cache lines 120(0)-120(C) for eviction.

Accordingly, when the cache controller 116 receives the data 129 corresponding to a memory access operation to the memory address 128 (e.g., as a result of the execution pipeline 104 executing the memory read instruction 126, as a non-limiting example), the cache controller 116 stores the data 129 corresponding to the memory address 128 in a cache line (e.g., the cache line 120(0), as a non-limiting example). The cache controller 116 then determines whether the memory access operation is indicated as requiring scratchpad functionality.

In some aspects, the cache controller 116 may determine that the memory access operation is indicated as requiring scratchpad functionality by determining that the memory address 128 falls within an address range delimited by an upper memory address indicator 134 and/or a lower memory address indicator 136. For example, some aspects may provide that the address range may comprise an address range lower than the upper memory address indicator 134, an address range above the lower memory address indicator 136, or an address range between the upper memory address indicator 134 and the lower memory address indicator 136. The upper memory address indicator 134 and the lower memory address indicator 136 may each comprise a register or a dedicated memory location, as non-limiting examples. It is to be understood that the upper memory address indicator 134 and the lower memory address indicator 136 may be one of a plurality of upper and lower memory address indicators provided by the processor-based device 100 to specify multiple memory address ranges for which scratchpad functionality is to be provided. It is to be further understood that some aspects of the processor-based device 100 may provide only the upper memory address indicator 134 or only the lower memory address indicator 136.

Some aspects may provide that the cache controller 116 determines that the memory access operation is indicated as requiring scratchpad functionality based on one or more upper (i.e., higher order) bits of the memory address 128. As a non-limiting example, the cache controller 116 may determine that the memory access operation is indicated as requiring scratchpad functionality based on an otherwise-unused upper bit of the memory address 128 being set or cleared by software. Alternatively, the memory access operation may be indicated as requiring scratchpad functionality if a plurality of upper bits of the memory address 128 equal a given value. In some aspects in which the memory address 128 is a virtual memory address, the cache controller 116 may be configured to determine that the memory access operation is indicated as requiring scratchpad functionality based on an indicator 137 corresponding to the page table 117 of the plurality of page tables used for translating the memory address 128 to a physical memory address within the system memory 114. In this manner, every memory address 128 corresponding to the page table 117 associated with the indicator 137 can be indicated as requiring scratchpad functionality.

According to some aspects, software may indicate that data retrieved as a result of the memory access operation is to be treated as scratchpad data in the cache 118 by executing a custom scratchpad memory read instruction. In such aspects, the memory read instruction 126 may comprise a scratchpad memory read instruction 126 provided by an instruction set architecture (ISA) of the processor-based device 100, and the execution pipeline 104 may be configured to indicate to the cache controller 116 that the scratchpad memory read instruction 126 has executed. The cache controller 116 may then determine that the memory access operation is indicated as requiring scratchpad functionality based on the execution of the scratchpad memory read instruction 126, and handle the data 129 retrieved from the memory address 128 as described herein.

In response to determining that the memory access operation is indicated as requiring scratchpad functionality, the cache controller 116 is configured to set the scratchpad indicator 130(0) of the cache line 120(0) in which the data 129 corresponding to the memory address 128 is stored (e.g., by assigning a value of one (1), in aspects in which the scratchpad indicator 130(0) is a bit indicator). The scratchpad indicator 130(0) set in this manner indicates to the cache controller 116 that the cache line 120(0) is exempt from the replacement policy of the cache controller. This enables the cache line 120(0) to remain in the cache 118 without being evicted by the conventional cache maintenance operations of the cache controller 116. Subsequent memory read and write operations to the memory address 128 performed by software are then handled by the cache controller 116 in conventional fashion, which provides the software the performance benefits of scratchpad memory without the overhead and additional complexity of manual memory management.

In some aspects, if the scratchpad indicator 130(0) of the cache line 120(0) is the only scratchpad indicator set and the cache controller 116 determines that one of the cache lines 120(0)-120(C) should be evicted, then the cache controller 116 may be configured to select a candidate for eviction from among the cache lines 120(1)-120(C) for which the corresponding scratchpad indicators 130(1)-130(C) are not set. Such aspects thus would prevent the cache line 120(0) from ever being evicted as long as the scratchpad indicator 130(0) is set.

Alternatively, some aspects may provide that, if and only if a subsequent memory access operation is indicated as requiring scratchpad functionality, then the cache controller 116 may opt to replace one of the cache lines 120(0)-120(C) currently being used as scratchpad memory with a new cache line 120(x). Thus, in such aspects, the cache controller 116 is configured to select a candidate for eviction from among one or more cache lines of the plurality of cache lines 120(0)-120(C) for which a corresponding one or more scratchpad indicators 130(0)-130(C) are set, but only prior to inserting the new cache line 120(x) that corresponds to a subsequent memory access operation indicated as requiring scratchpad functionality. The cache line 120(0) therefore would be protected from eviction until the cache controller 116 needs to insert the new cache line 120(x), in which case the cache line 120(0) may be evicted in favor of the new cache line 120(x) even though the scratchpad indicator 130(0) is set.

In some aspects, it may be desirable to limit how many of the cache lines 120(0)-120(C) of the cache 118 are available for scratchpad emulation. Accordingly, in such aspects, the PE 102 provides a way indicator 138 that indicates a number of ways (such as the ways 124(0)-124(3)) in which cache lines 120(0)-120(C) corresponding to memory access operations indicated as requiring scratchpad functionality may be stored. The way indicator 138 may comprise a register or a dedicated memory location, as non-limiting examples. In some aspects in which the cache 118 provides four (4)-way set associativity, the value of the way indicator 138 may be interpreted by the cache controller 116 as follows:

Value of zero (0)=All cache lines 120(0)-120(C) are handled in conventional fashion (i.e., scratchpad indicators 130(0)-130(C) are ignored);

Value of one (1) to three (3)=Indicates a number of ways (e.g., the ways 124(0)-124(3)) within each set (e.g., the sets 122(0), 122(1)) in which scratchpad indicators 130(0)-130(C) may be set; and Value of four (4)=Scratchpad indicators 130(0)-130(C) may be set for any or all of the cache lines 120(0)-120(C).

Some aspects may further provide that, when use of the scratchpad emulation functionality of the cache controller 116 and the cache 118 is complete, the cache controller 116 is configured to clear one or more of the scratchpad indicators 130(0)-130(C) associated with the cache lines 120(0)-120(C) (e.g., by assigning a value of zero (0), in aspects in which the scratchpad indicators 130(0)-130(C) are bit indicators) to indicate that the corresponding cache lines 120(0)-120(C) are no longer exempt from the replacement policy of the cache controller 116. This may be accomplished in some aspects by executing a custom clear instruction ("CLEAR") 140 provided by the ISA to clear a given one of the scratchpad indicators 130(0)-130(C) and/or to clear all of the scratchpad indicators 130(0)-130(C). In some aspects, clearing the one or more of the scratchpad indicators 130(0)-130(C) may be accomplished by writing a specific value to a special memory-mapped region of the processor-based device 100, in response to which the processor-based device 100 is configured to clear one or more of the scratchpad indicators 130(0)-130(C). After the scratchpad indicators 130(0)-130(C) have been cleared, the cache controller 116 may resume applying the replacement policy of the cache controller 116 as needed to the cache lines 120(0)-120(C) that were previously exempt from the replacement policy. In this manner, conventional cache maintenance operations will eventually handle eviction of the cache lines 120(0)-120(C) and writing of the data therein back to the system memory 114 if necessary.

Figure 2:
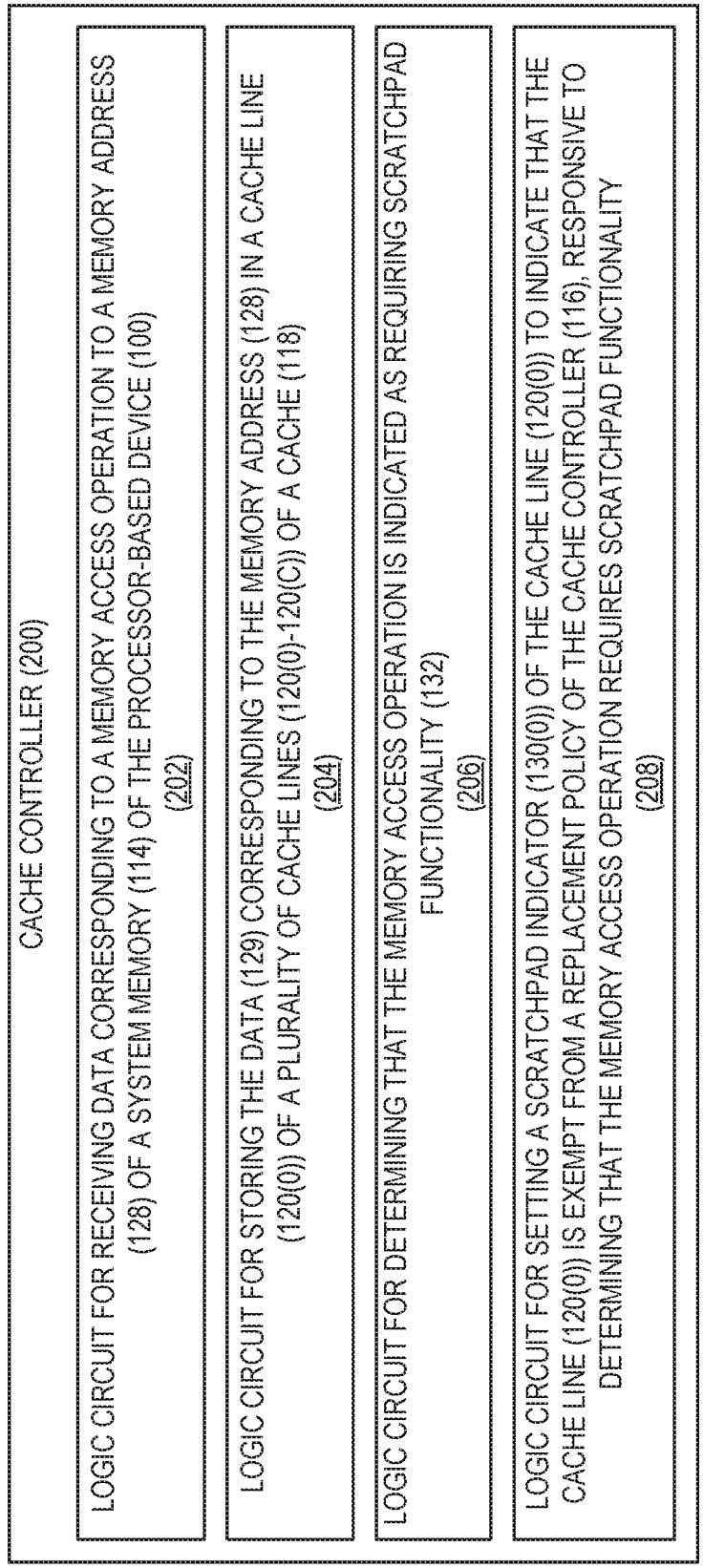
FIG. 2 is a block diagram illustrating exemplary constituent functional elements of the cache controller of FIG. 1, according to one aspect.

To illustrate exemplary constituent functional elements of the cache controller 116 of FIG. 1 according to some aspects, FIG. 2 provides a simplified diagram of a cache controller 200. As seen in FIG. 2, the cache controller 200, which corresponds in functionality to the cache controller 116 of FIG. 1, comprises a logic circuit 202 for receiving data corresponding to the memory access operation to the memory address 128 of the system memory 114 of the processor-based device 100. The logic circuit 202 thus may be referred to herein as a "means for receiving data corresponding to a memory access operation to a memory address of a system memory of the processor-based device." The cache controller 200 further comprises a logic circuit 204 for storing the data 129 corresponding to the memory address 128 in a cache line, such as the cache line 120(0), of the plurality of cache lines 120(0)-120(C) of the cache 118. Accordingly, the logic circuit 204 may be referred to herein as a "means for storing the data corresponding to the memory address in a cache line of a plurality of cache lines of a cache." It is to be understood that the logic circuits 202, 204, 206, and 208 may be interconnected among themselves, and/or among other elements of the cache controller 200 and/or other elements of the processor-based device 100 of FIG. 1. It is to be further understood that, while the logic circuits 202, 204, 206, and 208 are illustrated as separate elements in FIG. 2, some aspects may provide that one or more of the logic circuits 202, 204, 206, and 208 are constituent elements of other circuits or hardware structures within the cache controller 200.

The cache controller 200 also comprises a logic circuit 206 for determining that the memory access operation is indicated as requiring scratchpad functionality. In this regard, the logic circuit 206 may be referred to herein as a "means for determining that the memory access operation is indicated as requiring scratchpad functionality." Finally, the cache controller 200 additionally comprises a logic circuit 208 for setting a scratchpad indicator, such as the scratchpad indicator 130(0), of the cache line 120(0) to indicate that the cache line 120(0) is exempt from the replacement policy of the cache controller 116, responsive to determining that the memory access operation is indicated as requiring scratchpad functionality. The logic circuit 208 thus may be referred to herein as a "means for setting a scratchpad indicator of the cache line to indicate that the cache line is exempt from a replacement policy of a cache controller, responsive to determining that the memory access operation is indicated as requiring scratchpad functionality."

Figure 3A:
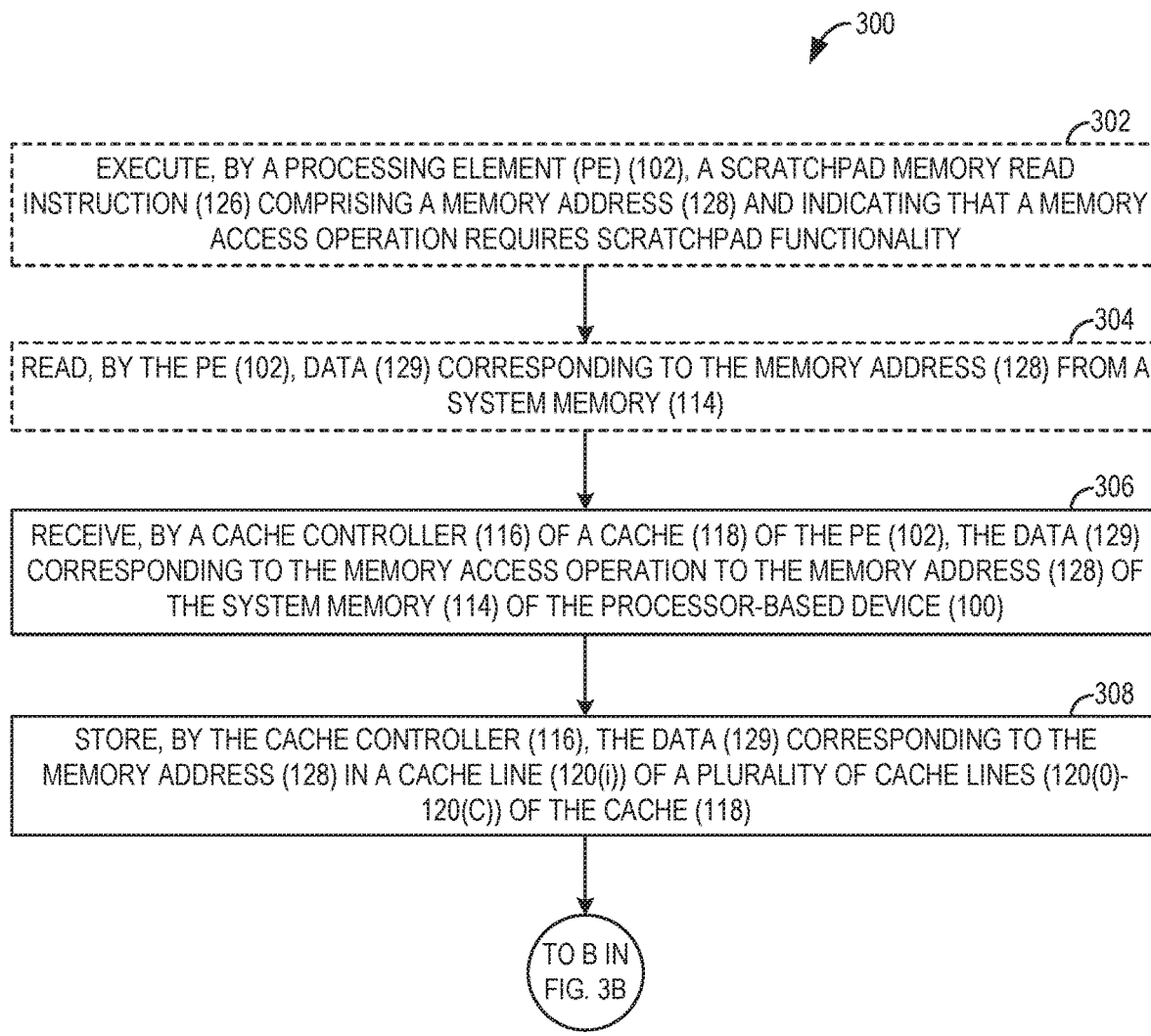
FIGS. 3A-3C are flowcharts illustrating exemplary operations of the processor-based device of FIG. 1 for emulating scratchpad functionality using caches.

To illustrate exemplary operations of the processor-based device 100 of FIG. 1 for emulating scratchpad functionality using the cache controller 116 and the cache 118 of FIG. 1, FIGS. 3A-3C provide a flowchart 300. For the sake of clarity, elements of FIG. 1 are referenced in describing FIGS. 3A-3C. In FIG. 3A, operations according to some aspects begin with the PE 102 executing a scratchpad memory read instruction (e.g., the memory read instruction 126, in some aspects) comprising the memory address 128 and indicating that the memory access operation requires scratchpad functionality (block 302). The PE 102 may then read the data 129 corresponding to the memory address 128 from the system memory 114 (block 304).

The cache controller 116 of the cache 118 of the PE 102 receives the data 129 corresponding to the memory access operation to the memory address 128 of the system memory 114 of the processor-based device 100 (block 306). The cache controller 116 stores the data 129 corresponding to the memory address 128 in a cache line 120(i) of the plurality of cache lines 120(0)-120(C) of the cache 118 (block 308). Operations then continue in FIG. 3B.

Figure 3B:
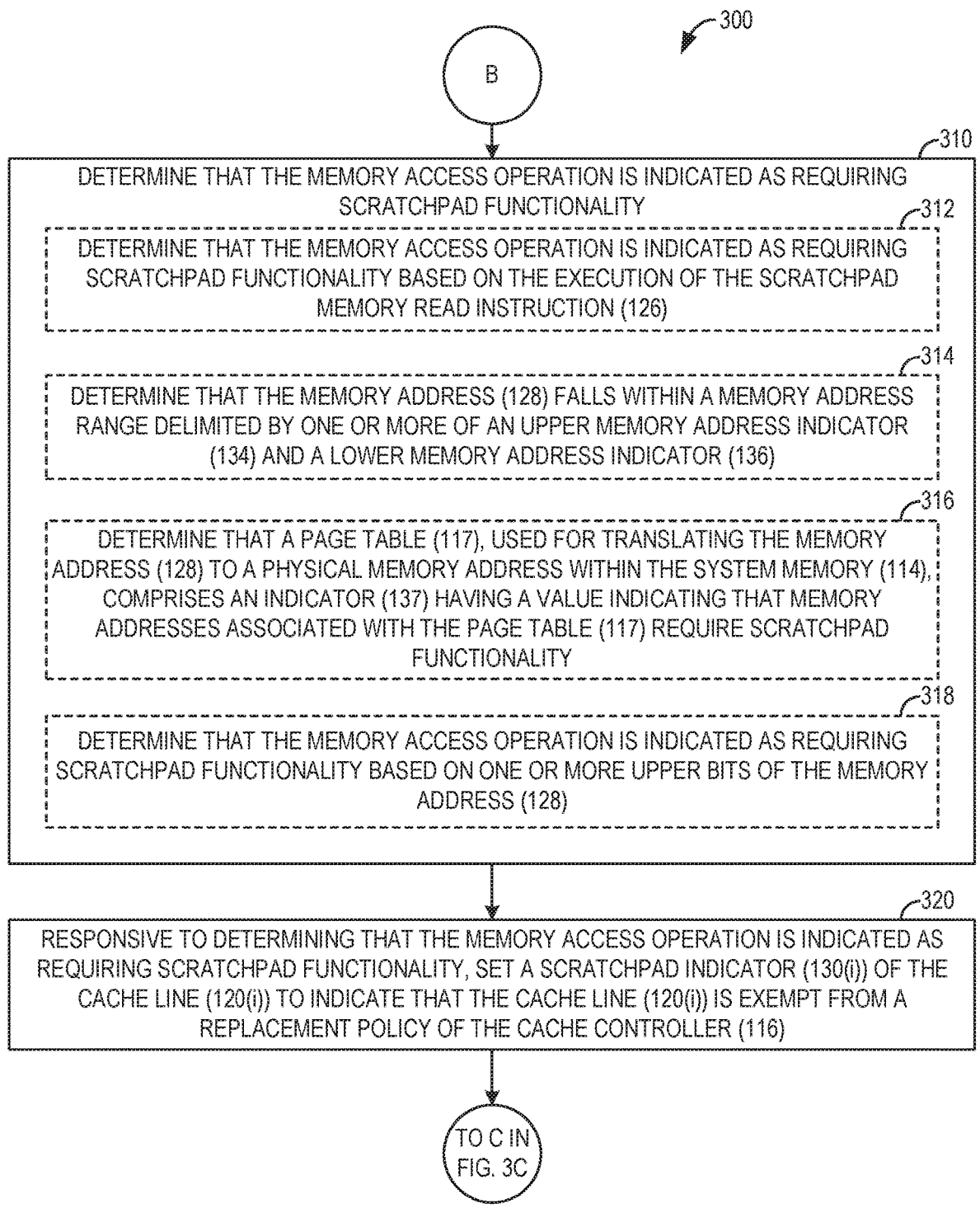

Referring now to FIG. 3B, the cache controller 116 next determines that the memory access operation is indicated as requiring scratchpad functionality (block 310). In some aspects, the operations of block 310 for determining that the memory access operation is indicated as requiring scratchpad functionality may comprise the cache controller 116 determining that the memory access operation is indicated as requiring scratchpad functionality based on the execution of the scratchpad memory read instruction 126 (block 312). Some aspects may provide that the operations of block 310 for determining that the memory access operation is indicated as requiring scratchpad functionality comprise the cache controller 116 determining that the memory address 128 falls within an address range delimited by one or more of the upper memory address indicator 134 and/or the lower memory address indicator 136 (block 314). In some aspects in which the memory address 128 comprises a virtual memory address, operations of block 310 for determining that the memory access operation is indicated as requiring scratchpad functionality may comprise the cache controller 115 determining that the page table 117, used for translating the memory address 128 to a physical memory address within the system memory 114, comprises the indicator 137 having a value indicating that memory addresses associated with the page table 117 require scratchpad functionality (block 316).

According to some aspects, operations of block 310 for determining that the memory access operation is indicated as requiring scratchpad functionality may comprise the cache controller 116 determining that the memory access operation is indicated as requiring scratchpad functionality based on one or more upper bits of the memory address 128 (block 318). Responsive to determining that the memory access operation is indicated as requiring scratchpad functionality, the cache controller 116 sets a scratchpad indicator 130(i) of the cache line 120(i) to indicate that the cache line 120(i) is exempt from the replacement policy of the cache controller 116 (block 320). Operations in some aspects may then continue in FIG. 3C.

Figure 3C:
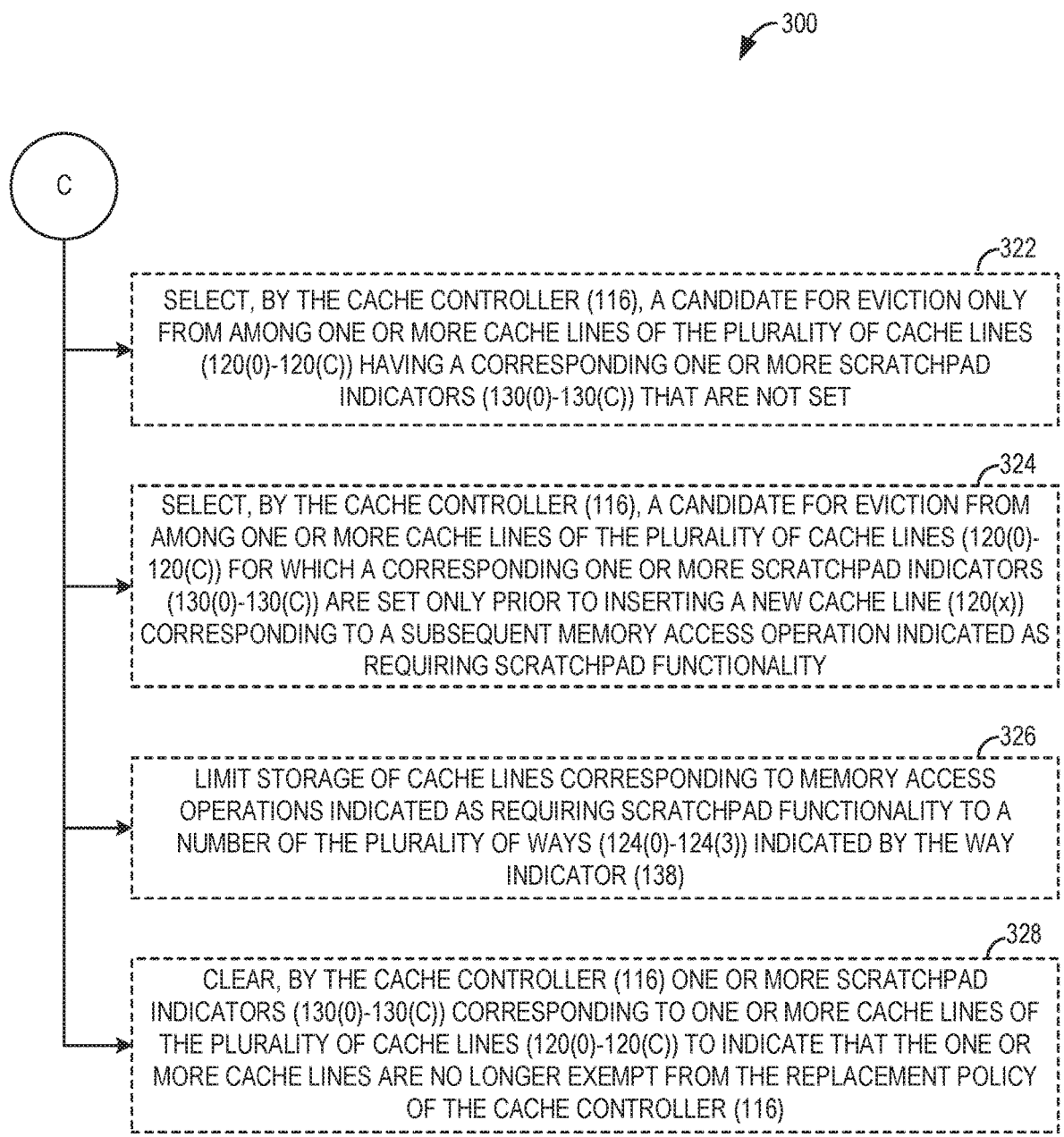

In FIG. 3C, exemplary operations that may be performed in some aspects are shown. Some aspects may provide that the cache controller 116 selects a candidate for eviction only from among one or more cache lines of the plurality of cache lines 120(0)-120(C) for which a corresponding one or more scratchpad indicators 130(0)-130(C) are not set (block 322). In some aspects, the cache controller 116 may select a candidate for eviction from among one or more cache lines of the plurality of cache lines 120(0)-120(C) for which a corresponding one or more scratchpad indicators 130(0)-130(C) are set only prior to inserting a new cache line 120(x) corresponding to a subsequent memory access operation indicated as requiring scratchpad functionality (block 324). Thus, in such aspects, if and only if a subsequent memory access operation is indicated as requiring scratchpad functionality, the cache controller 116 may opt to replace one of the cache lines 120(0)-120(C) currently being used as scratchpad memory with the new cache line 120(x). Some aspects may provide that the cache controller 116 limits storage of cache lines corresponding to memory access operations indicated as requiring scratchpad functionality to the number of the plurality of ways (such as the ways 124(0)-124(3)) indicated by the way indicator 138 (block 326). According to some aspects, the cache controller 116 is configured to clear one or more scratchpad indicators 130(0)-130(C) corresponding to one or more cache lines of the plurality of cache lines 120(0)-120(C) to indicate that the one or more cache lines are no longer exempt from the replacement policy of the cache controller 116 (block 328).

Emulating scratchpad functionality using caches in processor-based devices according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 4:
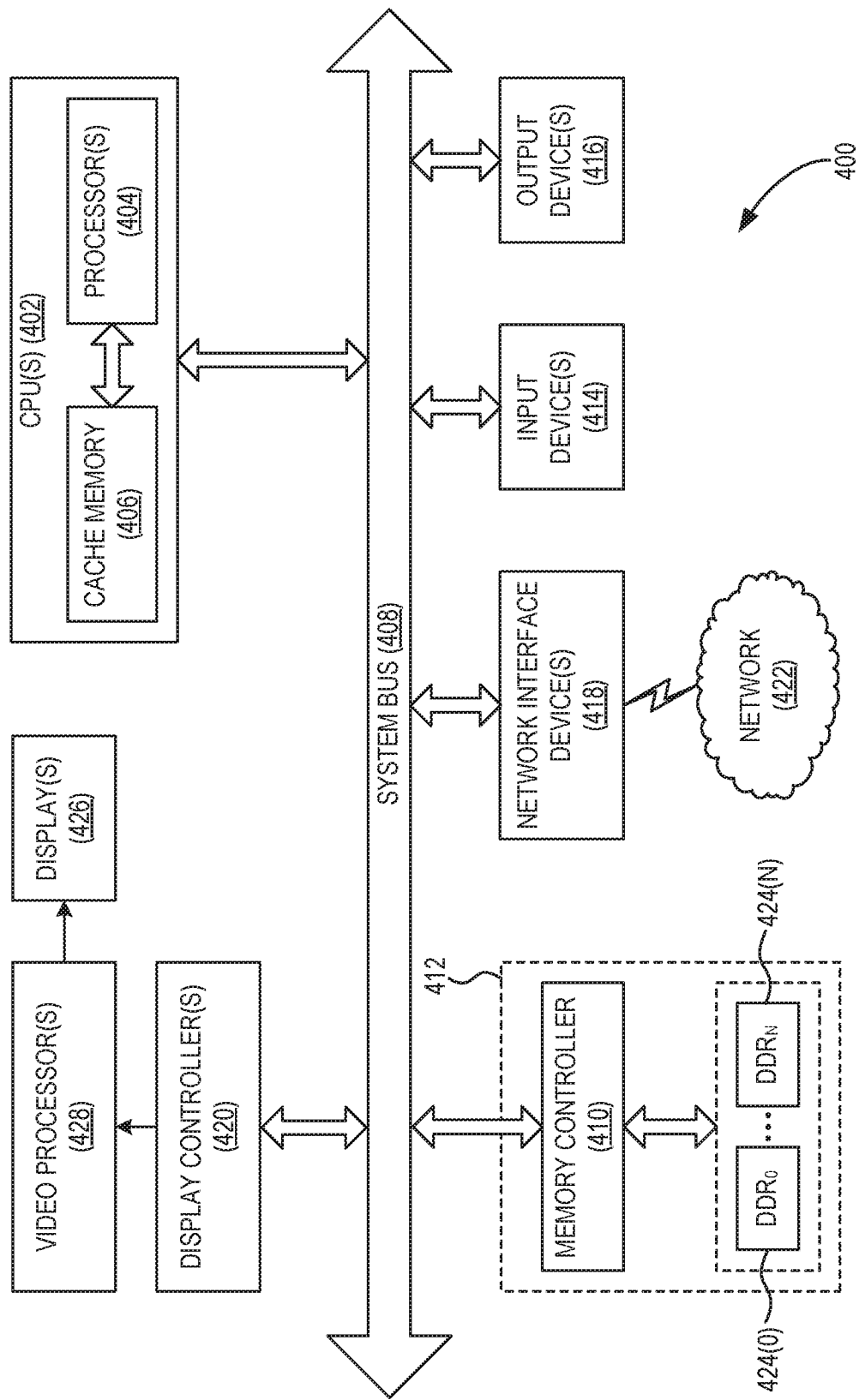
FIG. 4 is a block diagram of an exemplary processor-based device that can comprise the processor-based device of FIG. 1 for emulating scratchpad functionality using caches.

In this regard, FIG. 4 illustrates an example of a processor-based device 400 that may comprise the processor-based device 100 of FIG. 1. The processor-based device 400 includes one or more CPUs 402, each including one or more processors 404 (each of which, in some aspects, may correspond to the PE 102 of FIG. 1). The CPU(s) 402 may have cache memory 406 coupled to the processor(s) 404 for rapid access to temporarily stored data. The CPU(s) 402 is coupled to a system bus 408 and can intercouple master and slave devices included in the processor-based device 400. As is well known, the CPU(s) 402 communicates with these other devices by exchanging address, control, and data information over the system bus 408. For example, the CPU(s) 402 can communicate bus transaction requests to a memory controller 410 as an example of a slave device.

Other master and slave devices can be connected to the system bus 408. As illustrated in FIG. 4, these devices can include a memory system 412, one or more input devices 414, one or more output devices 416, one or more network interface devices 418, and one or more display controllers 420, as examples. The input device(s) 414 can include any type of input device, including, but not limited to, input keys, switches, voice processors, etc. The output device(s) 416 can include any type of output device, including, but not limited to, audio, video, other visual indicators, etc. The network interface device(s) 418 can be any type of device configured to allow exchange of data to and from a network 422. The network 422 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 418 can be configured to support any type of communications protocol desired. The memory system 412 can include one or more memory units 424(0)-424(N).

The CPU(s) 402 may also be configured to access the display controller(s) 420 over the system bus 408 to control information sent to one or more displays 426. The display controller(s) 420 sends information to the display(s) 426 to be displayed via one or more video processors 428, which process the information to be displayed into a format suitable for the display(s) 426. The display(s) 426 can include any type of display, including, but not limited to, a cathode ray tube (CRT), a liquid crystal display (LCD), a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices, and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

What is claimed is:

1. A processor-based device, comprising:
 a system memory; and
 a processing element (PE) comprising a cache controller and a cache, the cache comprising a plurality of cache lines and a corresponding plurality of scratchpad indicators to indicate whether each corresponding cache line is exempt from a replacement policy of the cache controller;
 the cache controller configured to:
  receive data corresponding to a memory access operation to a memory address of the system memory;

store the data corresponding to the memory address in a cache line of the plurality of cache lines of the cache;

determine that the memory access operation is indicated as requiring scratchpad functionality; and responsive to determining that the memory access operation is indicated as requiring scratchpad functionality, set a scratchpad indicator of the cache line to indicate that the cache line is exempt from the replacement policy of the cache controller.

2. The processor-based device of claim 1, wherein the cache controller is further configured to select a candidate for eviction only from among one or more cache lines of the plurality of cache lines for which a corresponding one or more scratchpad indicators of the plurality of scratchpad indicators are not set.

3. The processor-based device of claim 1, wherein the cache controller is further configured to select a candidate for eviction from among one or more cache lines of the plurality of cache lines for which a corresponding one or more scratchpad indicators of the plurality of scratchpad indicators are set only prior to inserting a new cache line corresponding to a subsequent memory access operation indicated as requiring scratchpad functionality.

4. The processor-based device of claim 1, wherein:
the PE is configured to:
execute a scratchpad memory read instruction comprising the memory address and indicating that the memory access operation requires scratchpad functionality; and
read the data corresponding to the memory address from the system memory; and
the cache controller is configured to determine that the memory access operation is indicated as requiring scratchpad functionality based on the execution of the scratchpad memory read instruction.

5. The processor-based device of claim 1, further comprising one or more of an upper memory address indicator representing an upper bound of a memory address range and a lower memory address indicator representing a lower bound of the memory address range;
wherein the cache controller is configured to determine that the memory access operation is indicated as requiring scratchpad functionality by being configured to determine that the memory address falls within the memory address range delimited by the one or more of the upper memory address indicator and the lower memory address indicator.

6. The processor-based device of claim 1, wherein the cache controller is configured to determine that the memory access operation is indicated as requiring scratchpad functionality by being configured to determine that a page table, used for translating the memory address to a physical memory address within the system memory, comprises an indicator having a value indicating that memory addresses associated with the page table require scratchpad functionality.

7. The processor-based device of claim 1, wherein the cache controller is configured to determine that the memory access operation is indicated as requiring scratchpad functionality based on one or more upper bits of the memory address.

8. The processor-based device of claim 1, wherein:
the cache comprises a plurality of sets each comprising a plurality of ways;
the PE further comprises a way indicator indicating a number of the plurality of ways of the cache in which cache lines corresponding to memory access operations indicated as requiring scratchpad functionality can be stored; and
the cache controller is further configured to limit storage of the cache lines corresponding to the memory access operations indicated as requiring scratchpad functionality to the number of the plurality of ways indicated by the way indicator.

9. The processor-based device of claim 1, wherein the cache controller is further configured to clear one or more scratchpad indicators of the plurality of scratchpad indicators corresponding to one or more cache lines of the plurality of cache lines to indicate that the one or more cache lines are no longer exempt from the replacement policy of the cache controller.

10. The processor-based device of claim 1 integrated into an integrated circuit (IC).

11. The processor-based device of claim 1 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile processor-based device; a wearable processor-based device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

12. A method for emulating scratchpad functionality using caches in processor-based devices, the method comprising:
receiving, by a cache controller of a cache of a processing element (PE) of a processor-based device, data corresponding to a memory access operation to a memory address of a system memory of the processor-based device;
storing, by the cache controller, the data corresponding to the memory address in a cache line of a plurality of cache lines of the cache, wherein the cache further comprises a plurality of scratchpad indicators that correspond to the plurality of cache lines, and that indicate whether each corresponding cache line is exempt from a replacement policy of the cache controller;
determining that the memory access operation is indicated as requiring scratchpad functionality; and
responsive to determining that the memory access operation is indicated as requiring scratchpad functionality, setting a scratchpad indicator of the cache line to indicate that the cache line is exempt from the replacement policy of the cache controller.

13. The method of claim 12, further comprising selecting, by the cache controller, a candidate for eviction only from among one or more cache lines of the plurality of cache lines for which a corresponding one or more scratchpad indicators of the plurality of scratchpad indicators are not set.

14. The method of claim 12, further comprising selecting, by the cache controller, a candidate for eviction from among one or more cache lines of the plurality of cache lines for which a corresponding one or more scratchpad indicators of the plurality of scratchpad indicators are set only prior to inserting a new cache line corresponding to a subsequent memory access operation indicated as requiring scratchpad functionality.

15. The method of claim 12, further comprising:
executing, by the PE, a scratchpad memory read instruction comprising the memory address and indicating that the memory access operation requires scratchpad functionality; and
reading, by the PE, the data corresponding to the memory address from the system memory;
wherein determining that the memory access operation is indicated as requiring scratchpad functionality is based on the execution of the scratchpad memory read instruction.

16. The method of claim 12, wherein:
the PE further comprises one or more of an upper memory address indicator representing an upper bound of a memory address range and a lower memory address indicator representing a lower bound of the memory address range; and
determining that the memory access operation is indicated as requiring scratchpad functionality comprises determining that the memory address falls within an address range delimited by the one or more of the upper memory address indicator and the lower memory address indicator.

17. The method of claim 12, wherein determining that the memory access operation is indicated as requiring scratchpad functionality is based on one or more upper bits of the memory address.

18. The method of claim 12, wherein:
the cache comprises a plurality of sets each comprising a plurality of ways;
the PE further comprises a way indicator indicating a number of the plurality of ways of the cache in which cache lines corresponding to memory access was marked with scratchpad functionality can be stored; and
the method further comprises limiting storage of the cache lines corresponding to the memory access was marked with scratchpad functionality to the number of the plurality of ways indicated by the way indicator.

19. The method of claim 12, further comprising clearing, by the cache controller, one or more scratchpad indicators of the plurality of scratchpad indicators corresponding to one or more cache lines of the plurality of cache lines to indicate that the one or more cache lines are no longer exempt from the replacement policy of the cache controller.

20. A processor-based device, comprising:
a means for receiving data corresponding to a memory access operation to a memory address of a system memory of the processor-based device;
a means for storing the data corresponding to the memory address in a cache line of a plurality of cache lines of a cache of a processing element (PE) of the processor-based device, wherein the cache further comprises a plurality of scratchpad indicators that correspond to the plurality of cache lines, and that indicate whether each corresponding cache line is exempt from a replacement policy of a cache controller;
a means for determining that the memory access operation is indicated as requiring scratchpad functionality; and
a means for setting a scratchpad indicator of the cache line to indicate that the cache line is exempt from the replacement policy of the cache controller, responsive to determining that the memory access operation is indicated as requiring scratchpad functionality.

* * * * *